Patented Aug. 21, 1928.

1,681,750

UNITED STATES PATENT OFFICE.

HENRY HERMAN STORCH, OF NEW YORK, N. Y., ASSIGNOR TO THE ROESSLER & HASS-LACHER CHEMICAL COMPANY, OF NEW YORK, N. Y., A CORPORATION OF NEW YORK.

SYNTHESIS OF ORGANIC COMPOUNDS.

No Drawing. Application filed May 16, 1927. Serial No. 191,924.

This invention relates to the synthesis of methanol from hydrogen and carbon monoxide and specifically has for its object the preparation and use of a copper catalyst for the reaction $2H_2 + CO = CH_3OH$.

Copper has been mentioned as a catalyst for this reaction, but no details have ever been given. I have found that copper unless especially prepared is not a catalyst. That is, metallic sheet copper, copper gauze, or copper obtained from salts by precipitation and reduction, and the like, as ordinarily used in catalytic reactions are entirely unsuited and either do not give methyl alcohol from hydrogen and carbon monoxide or give only indifferent results.

I have found that copper obtained from copper hydroxide which has been made by precipitation from certain classes of copper salts is much more advantageous for the synthesis of methanol than reduced copper as heretofore known. My method of preparation is in general characterized by the preparation of a reduced copper starting from copper in a complex copper compound. By a complex copper compound I mean one such as is formed for example, by treatment of a copper salt solution with sufficient ammonium hydroxide to redissolve the precipitate formed by the first ammonia added. All salts of copper, except the sulphides, are soluble in ammonium hydroxide. All cuprous salts are insoluble in water. Ammonium hydroxide added short of saturation to an aqueous solution of a cupric salt precipitates a pale blue basic salt; added just to saturation, the deep blue hydroxide $Cu(OH)_2$; added to supersaturation the precipitate $Cu(OH)_2$ redissolves to an intensely deep blue solution. The blue solution is that of a cuprammonium compound or complex copper ammonium salt. If cupric sulphate is the starting material, the cuprammonium compound is probably $CuSO_4.(NH_3)_4$ which in the deep blue solution probably is in a hydrated form i. e.

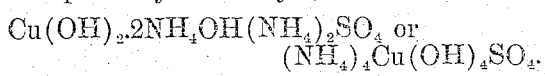

Other salts than the sulphate form the corresponding compounds e. g.

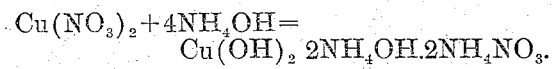

I prepare a copper-oxygen compound from this complex salt by addition of sodium hydroxide to the solution and boiling the solution to expel the ammonia. The copper oxide finally formed by my method gives, on reduction, a catalyst far better than that secured by precipitation without the use of the ammonia complex intermediate. The reduction can be carried out by passing hydrogen, or mixtures of hydrogen with carbon monoxide or methanol or both over the heated mass. I prefer to reduce with hydrogen saturated at room temperature with methanol. In order to prevent large uncontrollable increases in temperature during reduction it is usually desirable to dilute the reducing gas with nitrogen or other inert gas. For example a satisfactory mixture would be 3 volumes hydrogen, 2 volumes methanol vapor and 95 volumes nitrogen. This reducing mixture is passed at atmospheric pressure over the dried precipitate preferably contained in a copper lined vessel and heated to not over 300° C., and preferably to about 150–200° C.

The copper oxide may be obtained from the precipitate as a powder without a support, in which case the final reduced catalyst will be in a more or less powdered state, or the copper oxide may be precipitated in the presence of asbestos, pumice, calcined magnesia, or gels such as freshly precipitated magnesia, and the like; in these cases the final catalyst form will be my active reduced copper dispersed on the support. Freshly precipitated, undried magnesia, silica or alumina are especially effective for the formation of supports.

My copper catalyst is also useful for general hydrogenation and dehydrogenation reactions in which other forms of copper have been used.

As an indication of the value of my new catalyst over reduced copper as prepared in ordinary methods I have made a test of an ordinary reduced copper catalyst. This catalyst was prepared by precipitation of copper oxide from copper nitrate solution with sodium hydroxide and then reducing the copper oxide with hydrogen saturated with methyl alcohol. 425 parts of pure copper oxide were dissolved in dilute nitric acid; 100 parts of acid washed asbestos was stirred into this solution. A 50% solution of sodium hydroxide was now stirred in until the solution was strongly alkaline; the mixture was then boiled 15–20 minutes. The solids were separated by filtration, washed with distilled water until free from alkali metal salts, and then dried over night at 150–160° C. This dried material was reduced at 200° C. by treatment at atmospheric pressure with hydrogen saturated at room temperature with methanol, and the mixture diluted with nitrogen, thus producing reduced copper on asbestos.

This catalyst was tested for its activity in the methanol syntheses, utilizing a gas mixture having a composition of about $4H_2 + CO$ at 250° C., 3000 lbs/in² pressure and a space velocity per hour (S. V. H.) of about 2500. A space time yield (S. T. Y.) equivalent to about 9 lbs. of methanol per 24 hours per cubic foot of occupied catalyst space was obtained. At 310° C. with all other conditions the same, an S. T. Y. of 75 was obtained; at 350° C. an S. T. Y. of 190 was obtained which in 7 hours dropped off to 132.

The following is an example of my preferred method of preparation and operation:

800 parts of cupric nitrate [$Cu(NO_3)_2.3H_2O$] were dissolved in 1500 parts of water; sufficient ammonia was added to redissolve the precipitate formed by the first ammonia added and to render the solution slightly alkaline. An excess (about 500 parts) of sodium hydroxide (as a 50% aqueous solution) was added, and about 40 parts acid washed, medium fibred asbestos stirred in. This mixture was boiled until no odor of ammonia was noticeable after which it was filtered and the precipitate washed with distilled water and finally dried at 120 to 130° C. for 12 hours. This material was reduced by heating to 150–200° C. and passing a nitrogen-hydrogen-methanol mixture through it.

This catalyst was tested with a gas mixture of $4H_2 + CO$ at a pressure of 3000 lbs., an S. V. H. of about 3000 (calculated at 0° and 1 atmosphere), and at a temperature of 315–320° C. An average S. T. Y. of 548 was obtained during a period of 30 hours; the following 12 hours gave an average S. T. Y. of 448. The methanol was recovered from the off-gases in these runs by cooling under pressure.

I have obtained similar high yields with silica and alumina supports.

I have found it advantageous, when no support is used, to compress the powdered catalyst into the form of pills; this powdered form may be prepared by omitting the asbestos in the example given above. This pill formation is preferably carried out with the unreduced precipitate after which the pills are subjected to the reducing action as stated above. These pills may be of any convenient size and may be formed by ordinary pill making machines. I have found, for example, that pills about one-fourth inch in diameter and one-eighth inch thick give somewhat better yields than the unsupported powder or granular forms.

I have also prepared a catalyst from the cuprammonium salt solution by evaporating the solution to dryness in the presence of active charcoal. The residue and carrier were then heated for two hours at 200° C. and then the copper was formed on charcoal by reduction as previously described. Under essentially the conditions of operation given above substantial yields of methanol were obtained.

In employing this catalyst it is desirable to use gases free from the common catalyst poisons which may be present in the raw materials, such as, for example, arsenic, sulphur, phosphorous, volatile iron compounds or other deleterious constituents gathered during the gas production.

I do not in any way wish to be restricted to the exact quantities, proportions, etc. given in the preferred examples of catalyst manufacture since these may be varied, and yet my catalyst would be obtained. Nor do I wish to be limited in their utilization to the preferred examples of methanol manufacture which I have given by way of illustration. I have used these catalysts under many varying conditions and find that wide limits of pressure and temperature are permissible. All the factors such as temperature, S. V. H., pressure, etc. may be varied within wide limits in order to secure various S. T. Y's. or percent conversions which may be desired because of mechanical or manufacturing economies.

This catalyst has also given good results with gas mixtures where the proportion of hydrogen to carbon monoxide was less as well as greater than that given in my preferred example. My catalyst will form methanol from a gas mixture having any ratio of hydrogen to carbon monoxide, but if the ratio is below one to one by volume the S. T. Y. will be considerably lower than that obtained with hydrogen in excess by volume. In general I prefer not to use less hydrogen than that required theoretically by the equation:

$$2H_2 + CO = CH_3OH$$

I have found that a gas containing about four volumes of hydrogen to each volume of carbon monoxide gives the best results, and that with about 6 volumes of hydrogen the S. T. Y. is somewhat lower. For economic reasons I therefore prefer not to exceed 6 volumes of hydrogen for each volume of carbon monoxide, but I do not wish to be limited to this amount since methanol will be formed with the higher hydrogen ratios.

This catalyst is also suited for the above syntheses at temperatures ranging between 150° C. and 450° C. although I have found the best results are secured between 250° C. and 370° C. Within the temperature limits given above, methanol will be formed in substantial amounts by this catalyst at pressures of 100 lbs/in² and upwards, dependent on the temperature used. Substantial yields of methanol may even be obtained at pressures lower than this; for example, at one atmosphere. Under such conditions, however, the S. T. Y. is in general so much lower that the process would not be economical. I have found that good results are secured between 3000 and 4500 lbs/in², but do not wish to be limited to this range. The catalyst will form methanol under the pressure and temperature limits given above at any space velocity. Because of economic reasons, however, I prefer space velocities of 2000 to 20,000. The space velocities referred to here and those given in the examples of operation above are calculated with the gas volumes reduced to conditions of normal temperature and pressure i. e. 1 atmosphere and 0° C.

Claims:

1. Process for the synthesis of methanol which comprises passing a mixture of hydrogen and carbon monoxide over a heated catalyst comprising copper obtained from a cuprammonium compound.

2. Process for the synthesis of methanol which comprises passing a mixture of hydrogen and carbon monoxide over a heated catalyst comprising copper obtained by reduction of copper oxide prepared from a cuprammonium compound.

3. Process for the synthesis of methanol which comprises passing a mixture of hydrogen and carbon monoxide over a heated catalyst comprising copper obtained by reduction from cupric oxide derived from an ammoniacal solution of a copper salt.

4. Process for the synthesis of methanol which comprises passing a gaseous mixture of hydrogen and carbon monoxide containing hydrogen in excess, at elevated pressure in contact with a heated catalyst comprising copper obtained by reduction from cupric oxide derived from a solution of a cuprammonium salt.

5. Process for the synthesis of methanol which comprises passing a mixture of hydrogen and carbon monoxide under elevated pressure in contact with a catalyst comprising copper obtained by reduction from cupric oxide derived from a solution of a cuprammonium salt, said catalyst being maintained at a temperature of 150–450° C.

6. Process for the synthesis of methanol which comprises passing a mixture of hydrogen and carbon monoxide under a pressure of over 100 pounds per square inch in contact with a catalyst comprising copper obtained by reduction from cupric oxide derived from a solution of a cuprammonium salt, said catalyst being maintained at a temperature of 150–450° C.

7. Process for the synthesis of methanol which comprises passing a mixture of hydrogen and carbon monoxide under a pressure of 3000–4500 pounds per square inch in contact with a catalyst comprising copper obtained by reduction from cupric oxide derived from a solution of a cuprammonium salt, said catalyst being maintained at a temperature of 250–370° C.

8. Process for the synthesis of methanol which comprises passing a mixture of hydrogen and carbon monoxide containing hydrogen in excess, and under a pressure of over 100 pounds per square inch in contact with a catalyst comprising copper obtained by reduction from cupric oxide derived from a solution of a cuprammonium salt, said catalyst being maintained at a temperature of 250–370° C.

9. Process for the synthesis of methanol which comprises passing a mixture of hydrogen and carbon monoxide, containing an excess of hydrogen, at a pressure of over 100 pounds per square inch in contact with a catalyst heated to 250–370° C., said catalyst comprising copper obtained from a solution of a cuprammonium salt containing an excess of ammonia by adding thereto an excess of sodium hydroxide, filtering off the precipitate formed, washing this precipitate to remove alkali salts, drying and reducing the precipitated copper oxide.

10. Process for the synthesis of methanol which comprises passing a mixture of hydrogen and carbon monoxide, containing an excess of hydrogen, at a pressure of over 100 pounds per square inch in contact with a catalyst heated to 250–370° C., said catalyst comprising copper on a carrier obtained from a solution of a cuprammonium salt containing an excess of ammonia by adding thereto a carrier and an excess of sodium hydroxide, filtering off the carrier and the precipitate formed, washing this mixture to remove alkali salts, drying and reducing the precipitated copper oxide.

11. Process for the synthesis of methanol which comprises passing a mixture of hydrogen and carbon monoxide, containing an excess of hydrogen, at a pressure of over 100 pounds per square inch in contact with a catalyst heated to 250–370° C., said catalyst comprising copper obtained from an aqueous solution of a cuprammonium salt containing an excess of ammonia by adding thereto a carrier and an excess of sodium hydroxide, filtering off the carrier with the precipitate admixed, washing this mixture to remove alkali salts, drying and reducing the precipitated copper oxide on said carrier by means of hydrogen saturated with methanol.

12. Process for the synthesis of methanol which comprises passing a mixture of hydrogen and carbon monoxide, containing an excess of hydrogen, under a pressure of 3000–4500 pounds per square inch and at a space velocity of from 2000–20,000, in contact with a catalyst heated to 250–370° C., said catalyst comprising copper obtained from an aqueous solution of a cuprammonium salt by adding thereto an excess of sodium hydroxide, boiling the solution to expel ammonia, filtering, washing the precipitate to remove alkali salts, drying and finally reducing the precipitate by means of hydrogen saturated with methanol.

Signed at Perth Amboy in the county Middlesex and State of New Jersey this 12th day of May A. D. 1927.

HENRY HERMAN STORCH.